Figure 1:
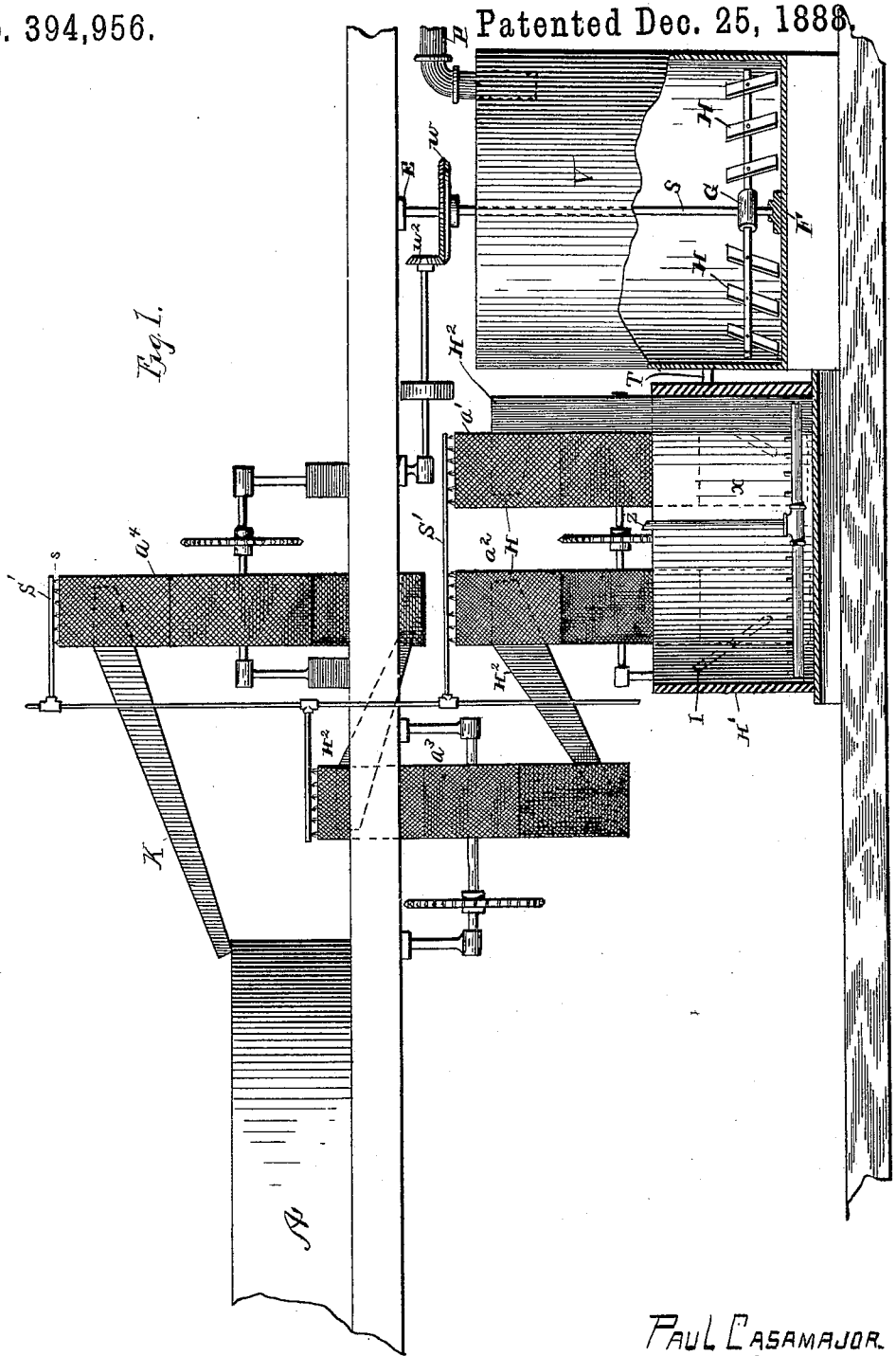

(No Model.) 3 Sheets—Sheet 2.

P. CASAMAJOR, Dec'd.
L. J. Casamajor, Executrix.
APPARATUS FOR CLEANSING AND RECOVERING SAWDUST OR SIMILAR FILTERING SUBSTANCES.

No. 394,956. Patented Dec. 25, 1888.

Paul Casamajor
Inventor

Witnesses
Ira R. Steward
Wm. H. Capel

Townsend & MacArthur
By his Attorneys (No Model.) 3 Sheets—Sheet 3.
P. CASAMAJOR, Dec'd.
L. J. CASAMAJOR, Executrix.
APPARATUS FOR CLEANSING AND RECOVERING SAWDUST OR SIMILAR FILTERING SUBSTANCES.
No. 394,956. Patented Dec. 25, 1888.
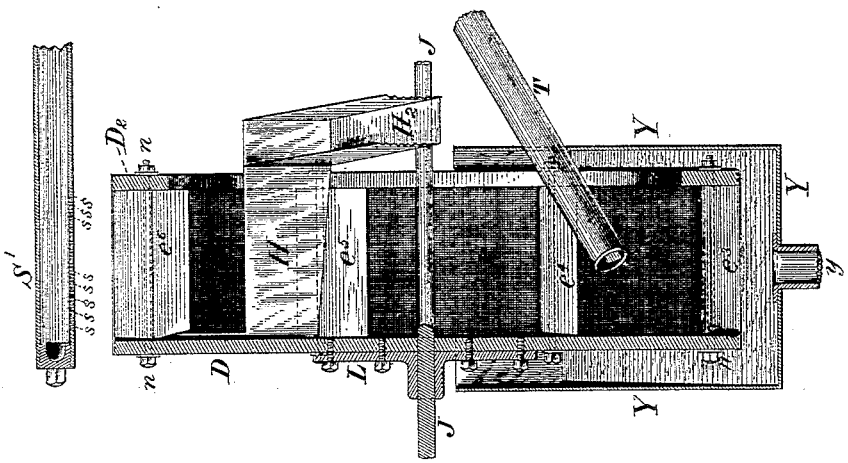
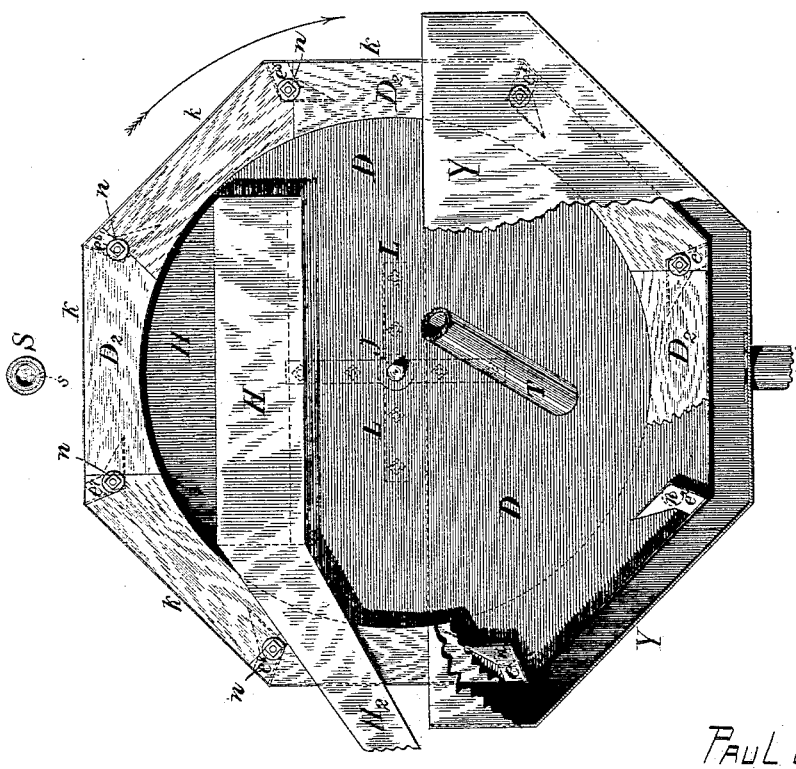
WITNESSES:
Ira R. Steward,
Wm. H. Capel
PAUL CASAMAJOR.
INVENTOR.
BY Townsend

UNITED STATES PATENT OFFICE.

LOUISE JANE CASAMAJOR, OF BROOKLYN, NEW YORK, EXECUTRIX OF PAUL CASAMAJOR, DECEASED.

APPARATUS FOR CLEANSING AND RECOVERING SAWDUST OR SIMILAR FILTERING SUBSTANCES.

SPECIFICATION forming part of Letters Patent No. 394,956, dated December 25, 1888.

Application filed April 18, 1888. Serial No. 271,250. (No model.)

*To all whom it may concern:*

Be it known that PAUL CASAMAJOR, (deceased,) late a citizen of the United States, and a resident of Brooklyn, in the county of Kings and State of New York, did invent a certain new and useful Improvement in Apparatus for Cleansing and Recovering Sawdust or Similar Filtering Substances, of which the following is a specification.

This invention relates to the filtering of saccharine or other solutions, or of any liquids holding solid matters in suspension, by means of sawdust or finely-comminuted woody fiber. This method or process has been already described in the specification of the United States Patent No. 270,634, granted to him January 16, 1883.

The present invention has particular and special reference to apparatus by means of which the sawdust or finely-divided woody fiber used for filtering is subsequently freed from the foreign substances and matters which have become attached to or deposited upon its surface during the operation of filtering, or during the time it was allowed to remain in contact with the solution or solutions to be filtered.

The object of the present invention is, further, to enable such sawdust or like filtering substance to be cleaned and rendered fit to be used again in filtering. Where large quantities of solutions are to be filtered, it is very desirable that the same filtering substance should be capable of serving for as great a quantity of the solution as possible.

By means of this invention the sawdust used in the above-mentioned process of filtering can be washed and cleaned easily and quickly at a slight expense and without much waste, so that the same sawdust can be used over and over again almost indefinitely.

In carrying out the invention the sawdust, with the substances and foreign matters abstracted by it from the solutions filtered, is first transferred from the filter to a suitable vessel, where it is agitated and stirred with considerable violence in the presence of water. By this operation the particles of foreign matter are loosened and separated from the particles of sawdust. The next step is to pass the sawdust through a mechanism or an apparatus actuated by power, by means of which the sawdust is first strained of the dirty water and then rinsed with clean water. This operation of straining and rinsing is repeated as many times as is deemed necessary or desirable. The sawdust is then transferred to another vessel, where it is again strained. It is now ready to be used again for filtering purposes, and is found to be as efficient as freshly-prepared sawdust.

The nature and purpose of the invention having been set forth, the same will now be described more in detail in connection with the accompanying drawings, forming a part of this specification, in order that its construction, operation, and functions may be more perfectly understood, and persons skilled in the art to which the invention pertains enabled to practice, apply, or work the same.

Figure 2:
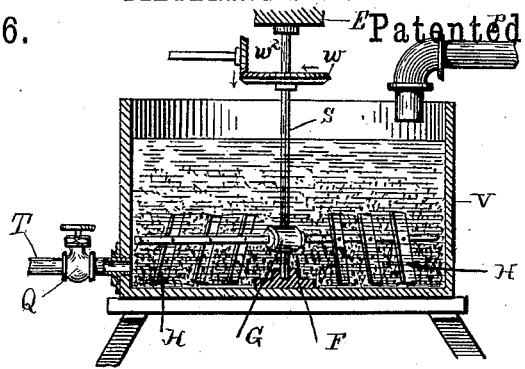
Figure 3:
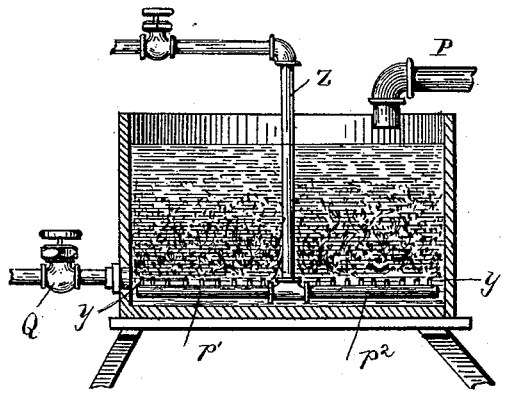
Figure 6:
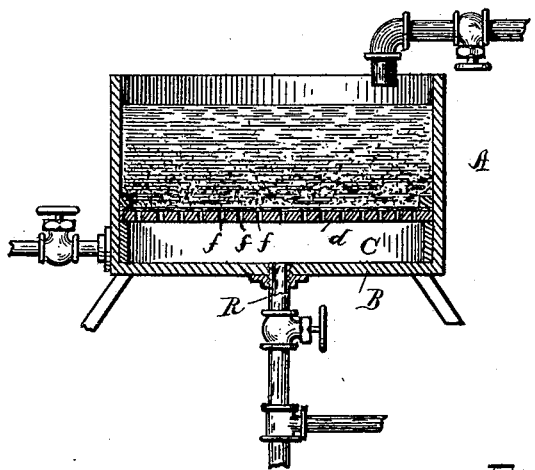

In the accompanying drawings, Figure 1 is a side elevation of the complete apparatus, showing the relation of the various parts to each other, certain details of construction of the parts being omitted for convenience of illustration. Fig. 2 is a vertical central section of the agitating-vat. Fig. 3 shows a secondary form of agitating-vat to be used with or in place of the one shown in Fig. 2. Fig. 4 is a side elevation of the rotating sieve, broken away in parts to show the interior construction. Fig. 5 is a vertical cross-section of the same. Fig. 6 shows the vat for draining off the water from the cleaned sawdust after it leaves the last rotating sieve.

The sawdust to be cleaned is transferred to the agitating-vat V, which may be in either of the forms shown in Figs. 2 and 3, preferably by means of a centrifugal pump discharging it with some water through a pipe, as shown at P. The sawdust may also in some cases be conveyed to this vat in a trough or gutter. The agitating-vat V is provided with means for stirring or agitating the water and sawdust. A simple means of accomplishing this object, and one which is generally employed, consists of a vertical shaft, S, mounted on bearings E above and F below and receiving a rotary movement in some convenient manner, such as by means of a bevel gear-wheel, $w$, secured to its upper end and engaging with another gear-wheel, $w^2$, which receives its motion from a suitable source of power. The shaft S carries a spider, G, on the radiating arms of which are attached the vanes H H H. These vanes are fastened in a slanting or oblique direction, and their lower ends come close to the bottom of the vat V. The arrangement is always such that the lower edges of the vanes move in advance of the upper edge, and therefore the vanes in rotating produce a disturbance in the water very similar to that produced by the screw-propeller of a steamship. In this manner the sawdust is stirred with and in the water, and the agitation of the entire mass is effectively accomplished, whereby each particle of sawdust is loosened and separated from the foreign substances adhering to its surface.

In Fig. 3 is shown another device for effecting the agitation of the sawdust and water. In this case a current of compressed air, or in some cases of steam, is forced into the mixture of water and sawdust through the pipe Z, which connects near the bottom of the vat with a ramification of pipes, $p$ $p'$ $p^2$, through the perforations $y$ $y$ $y$ of which the air or steam is allowed to come in contact with the contents of the vat. The jets of air or steam in issuing from these orifices produce upward currents in the liquid, by which the entire mass is thoroughly agitated.

In practice both of these forms of agitating devices can be made use of in one installation, as will be seen in Fig. 1, where the form just described, Fig. 3, is shown at X, being placed so as to receive the sawdust and agitate it again after it has once been strained and rinsed.

The length of time during which the agitation is continued depends on the quantity and the condition of the sawdust to be cleaned, and is to be determined by experience in each case.

After the sawdust has been properly and sufficiently agitated with water, it is found that the foreign substances are all or nearly all separated from the particles of sawdust, and they are suspended in the water as impurities. The valve Q, Figs. 2 and 3, is now opened, and the impure water, with the sawdust floating in it, passes out through a pipe, as T, into the rotating sieve $a'$. Figs. 4 and 5 show the construction of this portion of the apparatus. On a horizontal shaft, J, resting in suitable bearings, (not shown in the drawings,) is mounted a metal spider, L. (Shown in dotted lines, Fig. 4, and in section in Fig. 5.) Secured to this spider by means of screws or bolts is a flat disk, D, preferably of polygonal outline, made up of flat pieces of wood joined together. It is found that the octagonal form shown in Fig. 4 is very convenient of construction and satisfactory in working, although it is not to be understood that the invention is limited to this form. The apparatus could also perform its functions more or less perfectly if made square, pentagonal, or hexagonal, or with any number of sides, or with the outline of a circle. At the corners of the periphery of the disk and projecting laterally from each corner, so as to resemble somewhat the paddles of a steamship side wheel, are wooden buckets $e$ $e'$ $e^2$ $e^3$ $e^4$ $e^5$ $e^6$ $e^7$ $e^8$, covered with sheet-iron. These buckets are walled in at their overhanging or free ends by a flat polygonal disk, $D^2$, built up of wood of the same outline as D, but having its interior cut out in the form of a circle, as shown in Fig. 4, so as to leave the inside space accessible from this side. In Fig. 4 a portion of this flat ring is removed, so as to expose the ends of the buckets $e$ $e^2$. Small iron bolts $n$, passing from one side of the rotating sieve, through the center of each bucket, to the other side, serves to make the structure firm and secure. The buckets are walled in from the outside by a strip of fine wire-cloth, $k$, which extends from the edges of one disk to those of the other, so as to cover the spaces between the buckets. The wire-cloth which is used for this purpose is of sufficiently fine texture to prevent the sawdust from passing through, but not too fine to prevent the finely-divided impurities to pass through with the water. It is found that wire-cloth having about fifty or sixty meshes to the inch is well adapted to this purpose.

At a short distance above the rotary sieve is placed a perforated pipe or sprinkler, S', through the openings $s$ in which water can be distributed over the wire-cloth of each segment of the apparatus as it revolves past the pipe. The water, which quickly drops down through the interstices in the wire-cloth, is not allowed to fall down to the opposite side below; but is caught by a trough, H, made of sheet metal, and ending in a gutter, $H^2$, made in one piece with it.

To catch the drip-water from the rotating sieve, it is found convenient to inclose it in a sheet-metal case—such as shown at Y—and provided with an opening at $y$, through which the water escapes to a drain-pipe or suitable receiver. When it is in operation, the rotating sieve is made to turn slowly or at a speed ranging from ten to twenty revolutions per minute.

The mixture of sawdust and impure water when drawn out from the agitating-vat, Fig. 2, is emptied into the rotating sieve at its lower part through the pipe T, as shown in Figs. 4 and 5. The mixture falling on the wire-cloth bottom of the cavity is quickly strained, the dirty water passing through the wire-cloth and being drained away through the opening $y'$ in the sheet-metal casing Y, surrounding the rotating sieve. Owing to the rotation of the shaft, which takes place in the direction of the arrow, Fig. 4, it will readily be seen that the buckets lift up the sawdust just as it is being strained. The buckets as they pass over the trough H become almost or entirely inverted in relative position and allow the sawdust to fall into the trough. At the same time the water falling in jets from the pipe S' serves to wash away the sawdust from the buckets and from the inner surface of the wire-cloth. This water, moreover, mingles in the trough H with the sawdust and serves to rinse it and at the same time agitate it, and in this way to cleanse it again of such dirt or impurities as still remain adhering to the particles of sawdust. The mixture of water and sawdust passes out and runs down the gutter H². This gutter may be arranged so as to empty the mixture into a second rotating sieve similar to that just described, and wherein the water will be again strained off, leaving the sawdust to be carried up by the buckets, so as to be again rinsed with clean water. This process may be repeated any desired number of times. In some cases it will be found that the sawdust is cleaned sufficiently by passing through two such rotating sieves, while in other cases as many as six sieves may be found necessary. From the last rotating sieve the sawdust and water are sent into the drying or draining vat. (Shown in central vertical section in Fig. 6.) At a slight distance above the bottom of the vat A is a partition or false bottom, $d$, having a very large number of small perforations, $f\ f\ f$. This partition is covered by one or more layers of felt, burlap, or similar fabric sufficiently pervious to the water, but of close enough texture to prevent the sawdust from passing through. The water quickly passes through the fabric into the intermediate space, C, below the false bottom, whence it can be drained by a pipe, R, controlled by a valve.

Having now described in detail the various devices used in the invention, it will now be shown more clearly how these devices are coordinated or disposed with respect to each other in the practical working of the said invention.

In Fig. 1 is shown the apparatus as applied in a chemical works or in a refinery when using four rotating sieves, $a'\ a^2\ a^3\ a^4$, arranged in "cascade" or in "series." The sawdust to be cleaned is first placed into the agitating-vat V, as already explained. From this vat the sawdust and impure water are emptied through the pipe T into the first rotating sieve, $a'$, where it is first drained of the impure water and then rinsed with clean water, in the manner already explained in detail. From the first sieve the sawdust is emptied by the gutter H² into a second agitating-vat, H'. This vat is of the kind shown in Fig. 3, in which agitation is effected by the pressure of compressed air or of steam which is allowed to escape into the contents of the vat. The water is preferably kept at a somewhat warm temperature in order to facilitate the cleaning process. From this vat the sawdust mixed with water is discharged through a pipe, I, into the second sieve, $a^2$. From the gutter of this sieve the rinsed sawdust is in turn discharged into the third sieve, in a manner clearly shown in Fig. 1. From this sieve it is again passed into the fourth sieve, where it receives the final rinsing, and from which it is conveyed through the gutter K into the draining-vat, where it is rid of its superfluous moisture, in the manner already described in detail.

It will be seen, by reference to Fig. 1, that the sawdust is raised from one floor to the next floor above in its passage from one sieve to the next. In many cases this feature is a great advantage, particularly where the process in connection with which the sawdust is used involves steps which are carried out on different floors. It will be apparent that by increasing the diameter of the rotating sieves, or else by increasing the number, the sawdust can be lifted to a still higher distance.

It will be seen from the foregoing description that the invention can be modified in details considerably without departing from its spirit.

The said invention moreover is applicable not only to the cleansing and treatment of sawdust, but of all finely-divided filtering substances of a fibrous or cellular nature—such as finely-divided wood-shavings, wood-pulp, brown coal, &c. The invention is not confined, therefore, to the exact forms or applications hereinbefore mentioned and set forth.

What is claimed as the invention is—

1. The combination of an agitating-vat for agitating a filtering substance in the presence of water, with a series of straining devices located on different levels and provided with means for passing the filtering substance upward through the series of straining devices.

2. The combination of an agitating-vat, a series of straining devices located on different levels and provided with means for passing the strained material upward through the series of straining devices, and sprinkling devices interposed between each pair of straining devices.

3. In an apparatus for cleansing filtering substances, the combination of two or more rotating sieves located on different levels, each sieve being provided with means for conveying the strained material from a lower to a higher level within the sieve, with ducts leading from each sieve into the next sieve of the series.

4. The combination, with an agitating-vat, of a vertically-rotating sieve provided with a circumferential straining net-work or mesh, elevating-buckets, an elevated trough within said sieve, and sprinkling devices located above said sieve and adapted to wash the material from said buckets into said troughs.

5. In combination, an agitating-vat, a vertically-rotating sieve having a circumferential net-work, a conveying-trough between the vat and sieve, elevating-buckets within the sieve, and an elevated trough, said buckets serving to convey the material from the bottom of said sieve to said trough, as described.

6. The combination, with an agitating-vat and its discharge-pipe leading into the rotating sieve, of a rotating sieve provided with elevating-buckets, a sprinkling device, and an elevated trough having a discharging-gutter connecting with said trough, the parts being arranged to operate substantially as described.

7. The combination, with an agitating-vat and its discharge-pipe, of a vertically-rotating sieve provided with a circumferential straining mesh or net-work, an elevated platform or trough, elevating-buckets adapted to discharge the strained residuum upon said platform or trough, and a discharge-gutter connecting with a second similar sieve located on a higher level.

8. In an apparatus for cleansing filtering substances, in combination, an agitating-vat, a series of two or more rotating sieves on different levels, elevators within each sieve for elevating the substance therein to a higher level, a conveyer between the agitating-vat and the lower part of the first sieve in the series, and a conveyer between the upper part of each sieve and the lower part of the next in series.

9. An organized apparatus for cleansing and straining filtering substances, comprising an agitating-vat having a pipe connecting with a rotating sieve, a vertically-rotating sieve provided with interior circumferential elevators or buckets, a second agitating-vat provided with a pipe leading to a second sieve, a second rotating sieve provided with interior elevators, troughs leading from the sieves, and sprinkling devices above each sieve, all arranged to operate as described.

Signed at Brooklyn, in the county of Kings and State of New York, this 7th day of April A. D. 1888.

LOUISE JANE CASAMAJOR,
*Executrix of Paul Casamajor, deceased*

Witnesses:
C. AUGUST HAVILAND,
GEO. H. CASAMAJOR.